United States Patent [19]

Baker et al.

[11] Patent Number: 4,578,674

[45] Date of Patent: Mar. 25, 1986

[54] METHOD AND APPARATUS FOR WIRELESS CURSOR POSITION CONTROL

[75] Inventors: David C. Baker, Austin, Tex.; David F. Bantz, Chappaqua, N.Y.; Gregory A. Flurry, Austin, Tex.

[73] Assignee: International Business Machines Corporation, Armonk, N.Y.

[21] Appl. No.: 486,630

[22] Filed: Apr. 20, 1983

[51] Int. Cl.[4] ............................................. G09G 1/00
[52] U.S. Cl. ..................... 340/710; 340/365 P; 178/18; 455/603
[58] Field of Search ............ 340/709, 710, 365 P, 340/365 R, 365 VL, 712; 455/617, 603; 178/18-20

[56] References Cited

U.S. PATENT DOCUMENTS

| 3,504,334 | 3/1970 | Turnage | 340/16 |
| 3,541,521 | 11/1970 | Koster | 340/710 |
| 4,103,278 | 7/1978 | Satake et al. | |
| 4,151,407 | 4/1979 | McBride et al. | 455/617 |
| 4,156,134 | 5/1979 | Minner | 455/603 |
| 4,313,183 | 1/1982 | Saylors | 367/128 |
| 4,426,738 | 1/1984 | Sato | 455/603 |

FOREIGN PATENT DOCUMENTS 8030151.7 9/1980 European Pat. Off. .

OTHER PUBLICATIONS

William M. Newman and Robert F. Sproull, "Principles of Interactive Computer Graphics", McGraw-Hill Company, 2nd Edition, pp. 154-155.
PCT/US81/00995, 2/18/82, Howells et al.
Funk, B. D., "CCDs in Optical Touch Panels Deliver High Resolution, (9/80), pp. 139-143, *Electronic Design*, vol. 28.
Lyon, R. F. et al, "Designing and Testing the Optical Mouse," *VLSI Design*, pp. 21-26 (Jan./Feb. 1982).
Fields, S. W., "Mouse Tracks Path by Electronics Only," *Electronics International*, vol. 55, No. 1, (Oct. 1982).

Primary Examiner—Marshall M. Curtis
Attorney, Agent, or Firm—George E. Clark; Alexander Tognino

[57] ABSTRACT

A method and apparatus for wireless cursor position control is disclosed herein. The apparatus comprises a wireless cursor position device and a separate control base whereby the direction and velocity of motion of the position device is monitored by the control base and used said direction and velocity of motion is to calculate the relative motion of the cursor on the display system. The method and apparatus operates by transmitting and receiving ultrasonic and infrared signals between the position device and control base and thereby calculating the movement of the position device from an initial location by measurement doppler shift of the signals. An output signal to the display system is then generated to move the cursor in correspondence with the motion of the position device.

8 Claims, 8 Drawing Figures

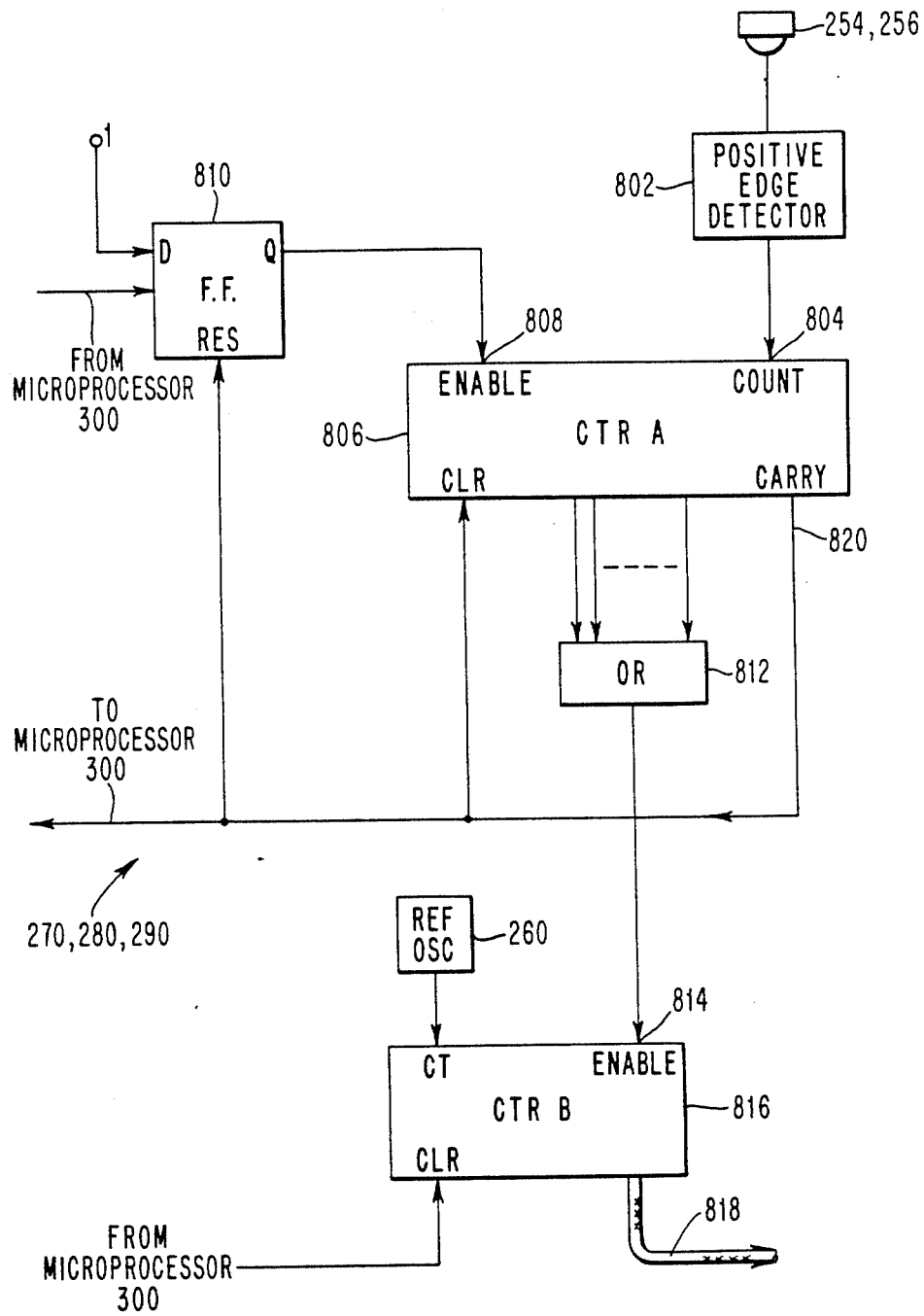

METHOD AND APPARATUS FOR WIRELESS CURSOR POSITION CONTROL

BACKGROUND OF THE INVENTION

1. Field of the Invention

The present invention relates to remote control systems and more particularly to means for controlling motion of an object from a remote device.

2. Description of the Prior Art

In the prior art there are many remote control systems. The following are systems representative of the prior art.

U.S. Pat. No. 4,111,421 shows an optically linked remote control apparatus for a video game.

Although the patent does show the use of modulated infrared light energy to control position of a light element on a display device in a video game, the patent neither shows or suggests the control of a cursor by a wireless velocity sensing system having ultrasonic and infrared signal generation and reception means to provide control in the X and Y planes.

U.S. Pat. No. 4,209,255 shows a means for roughly determining the coordinates of a point on a display viewed by an operator. The optical device located in front of the LED which tapers the energy pattern limits resolution of the system. Further, the system shown by the patent is position sensitive and not velocity sensitive as is the system according to the present invention.

U.S. Pat. No. 3,541,521 teaches control of the movement of a cursor on a screen by a wired to cursor control means wherein manual action of said control means results in the moving of said cursor by some varying multiple amount which is dependent upon the rate of the control means output.

U.S. Pat. No. 4,142,180 which is a "joy stick" cursor control system for video games. The control system of the patent relies on a hard wired connection between the joy stick control and the display device and is not velocity sensitive as is the device according to the present invention.

U.S. Pat. No. 3,809,395 teaches a video game having a plurality of hard wired projectile control devices for a number of players where each control device controls the position of the projectile. The patent, of course, does not teach a velocity sensing control system according to the present invention.

U.S. Pat. No. 4,045,789 shows an animated video image display system having an image position control hard wired to the system for generating X and Y coordinates of the image position. The patent neither teaches or suggests a velocity sensing cursor control system which is wireless according to the present invention.

U.S. Pat. No. 4,148,014 teaches a joy stick control of a display cursor which is hard wired to the display system for controlling direction and velocity of movement of a display cursor. The patent does not teach a wireless cursor control system in accordance with the present invention.

U.S. Pat. No. 4,303,914 teaches an input device for video display system which enables an operator to control movement of a display element by moving the input device sensor over a surface having microscopically pictured roughness such as a sheet of paper. The sensor includes first and second stylii in contact with the surface of the paper to detect motion along X and Y axes. The device is connected to the system by a cable. The patent does not teach the wireless velocity sensing cursor control device in accordance with the present invention.

U.S. Pat. No. 3,892,963 teaches a positional transducer element which controls X and Y coordinate positions of a cursor on a display system. The cursor control device of the patent is physically connected to the display system through a cable and is not a wireless velocity sensing cursor control device as is the present invention.

A book entitled "Principles of Interactive Computer Graphics" second edition, by William M. Newman and Robert F. Sproull published by McGraw Hill Book Company, 1979, discusses at pages 154 and 155, three dimensional input devices such as acoustic devices employing orthogonally related strip microphones mounted around edges of a two-dimensional tablet for calculating position in three-dimensions.

Although the referenced book discusses the use of acoustics to measure position, it does not teach a velocity sensing wireless cursor control device in accordance with the present invention.

An article entitled "Designing and Testing the Optical Mouse" appeared in the January/February 1982 issue of VLSI design at page 20 and following. The article relates to an optical mouse as a cursor control device which is wired to a display system and requires a special patterned pad on which the mouse must operate.

Although the article generally shows an improved optical mouse, the article does not teach a wireless cursor control device in accordance with the present invention.

The prior art discussed above does not teach nor suggest the patent invention as disclosed and claimed herein.

SUMMARY OF THE INVENTION

Therefore, it is an object of the present invention to control motion of an object by apparatus and method including a wireless position image device; and means for detecting direction and velocity of motion of said device to calculate relative motion of said object.

It is another object of the present invention to control a cursor in a display system by apparatus and method as above including first and second transducers for receiving and transmitting signals from which position and velocity of motion of the cursor position image device can be determined.

It is yet another object of the present invention to control a cursor in a display system by apparatus and method as above including a detector for detecting a first signal from the first transducer.

It is yet another object of the present invention to control a cursor in a display system by apparatus and method as above including a driver for driving the second transducer with the first signal detected from the first transducer to produce a second signal.

It is still another object of the present invention to control a cursor in a display system by apparatus and method as above including two or more receiving transducers for receiving the second signal from the cursor position image device to determine direction and velocity of motion of the device.

It is still another object of the present invention to control a cursor in a display system by apparatus and method as above including one or more means for detecting change in a first characteristic of the second signal received from the cursor position image device indicative of direction and velocity of motion of the device.

It is still another object of the present invention to control a cursor in a display system by apparatus and method as above including frequency shift detection means for detecting change in frequency of the second signal received from the device indicative of direction and velocity of motion of the device and processing means for generating cursor motion control signals to the display system in response to changes in the first characteristic of the second signals.

It is still another object of the present invention to control a cursor in a display system by apparatus and method as above including the steps of determining X and Y coordinates of an initial position of a cursor position control device relative to first and second detectors mounted in a base for determining direction and velocity of motion of the device from signals received by the first and second detectors from the device and generating cursor control signals to the display system from the direction and velocity of motion of the device.

It is still another object of the present invention to control a cursor in a display system by apparatus and method as above including the steps of transmitting a first signal from a transmitter in the base to a receiver in the device, detecting the first signal in the device, transmitting from the device a second signal generated from the detected first signal, receiving the second signal at the first and second detectors in the base, determining first and second difference signals from comparison of the first signal with outputs of the first and second transducers, and calculating cursor motion signals from the difference signals to move a cursor on a display screen in correspondence with the direction and velocity of motion of the cursor position control device.

Accordingly, apparatus and method according to the present invention includes a wireless cursor position control device and a control base for detecting direction and velocity of motion of said device to calculate relative cursor motion on a display system. The control device includes a light sensing detector, a demodulator for removing a reference signal from the detected light, and a transducer driven by the reference signal from the demodulator for transmitting a low frequency signal to the control base. The control base includes a light emitting transducer for transmitting a modulated light signal to the image device, a reference signal generator, two or more low frequency detectors for detecting signals transmitted by the control device transducer, means for comparing the outputs from the detectors, and means for generating cursor control signals from the compared detector output signals.

The foregoing and other objects, features and advantages of the invention will be apparent from the more particular description of the preferred embodiment of the invention, as illustrated in the accompanying drawing.

BRIEF DESCRIPTION OF THE DRAWING

FIG. 8 is a block diagram of an interval timer according to the present invention as shown in FIG. 6.

In the drawing, like elements are designated with similar reference numbers, and identical elements in different specific embodiments are designated by identical reference numbers.

DESCRIPTION OF THE PREFERRED EMBODIMENTS OF THE PRESENT INVENTION

An important consideration in the human-computer interface is the control of a cursor on a display screen.

A device generally referred to as a "mouse" has been found to be an efficient means for cursor control. Such a device is described in the article by Lyon and Haeberli, published in VLSI Design as described above under the background of the invention.

PRIOR ART

Figure 1:
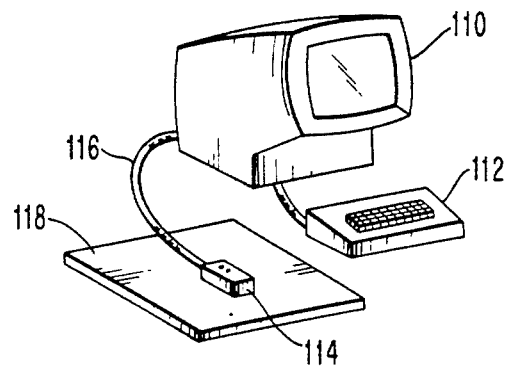
FIG. 1 is a perspective view of a prior art position sensing cursor control system employing a tablet based cursor control device.

A typical prior art cursor control mouse is shown in conjunction with a display system in FIG. 1.

In the prior art, a display terminal 110 has attached thereto a keyboard 112 and a cursor control mouse 114. The mouse 114 is attached to the terminal 110 by cable 116. Mouse 114 to operate properly must remain in contact with a patterned surface 118 so that the relative positions of mouse 114 and a cursor on the screen of display terminal 110 will be properly coordinated.

THE PRESENT INVENTION

Figure 2:
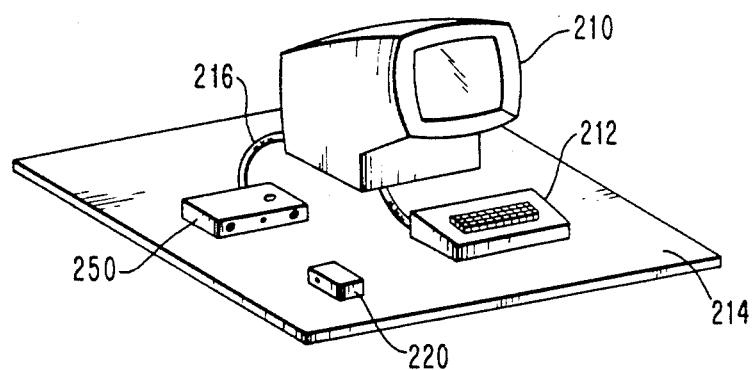
FIG. 2 is a perspective view of a display system including a cursor control device according to the present invention.

Referring now to FIG. 2, a wireless cursor control device according to the present invention will be described.

As in the prior art, a display terminal 210 has attached thereto a keyboard 212 for data entry. The display terminal and associated devices are placed on a suitable workstation surface such as 214. A wireless cursor control mouse 220 operates in conjunction with the control base 250 which is attached to display terminal 210 by cable 216. It should be noted that wireless mouse 220 need not be maintained in contact with surface 214 to operate properly and to control a cursor on display terminal 210.

Figure 3:
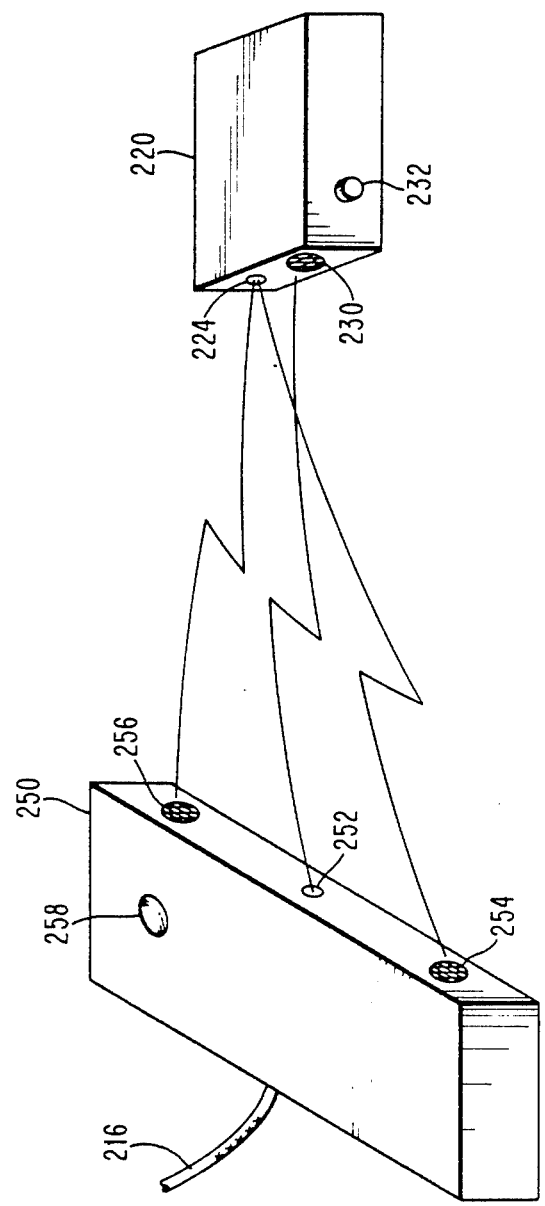
FIG. 3 is a diagram of a cursor control device according to the present invention.
Figure 4:
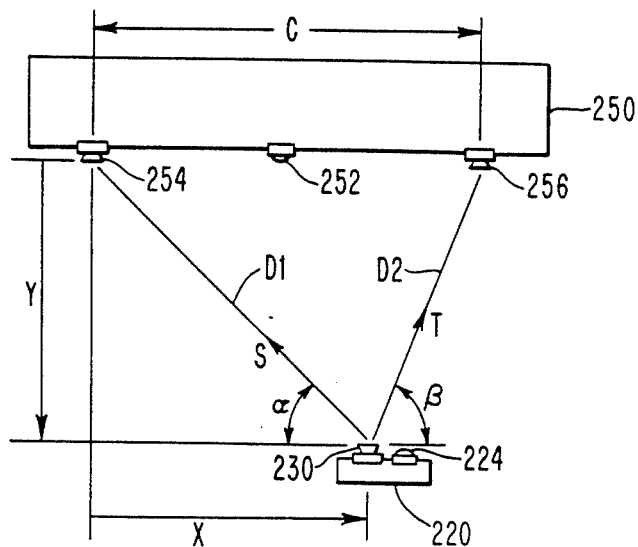
FIG. 4 is a plane view of a cursor control device according to the present invention showing the geometric relationship of system components.
Figure 5:
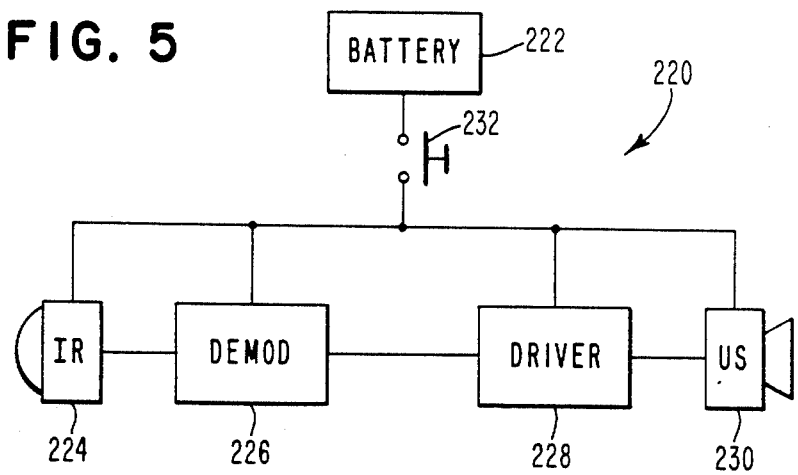
FIG. 5 is a block diagram of a wireless cursor control device according to the present invention.

Referring now to FIG. 3, 4 and 5, the relationship of the wireless cursor position image device or mouse 220 to the control base 250 will be described. Control base 250 includes an infrared emitter 252 and at least two ultrasonic detectors 254 and 256. If three dimensional cursor control is desired, additional ultrasonic detectors may be included in control base 250 although not shown in the present embodiment. It will be understood by those skilled in the art that the modification of the control base to adapt to a three dimensional control would be straightforward.

Control base 250 may also include a recess 258 for storing mouse 220 and recharging a battery 222 (see FIG. 5) used to supply power to the circuits and transducers in mouse 220.

Referring now more specifically to FIG. 5, the cursor position control device (mouse) 220 will be further described.

An infrared detector 224 is mounted on a surface of mouse 220 to detect infrared radiation emanating from infrared emitter 252. The signal output of infrared detector 224 is connected to demodulator 226 which removes a reference signal from the infrared signal. The output of the demodulator is connected to an input of an ultrasonic driver circuit 228. The detected reference signal nominally in the range of 40 kilohertz is used to drive ultrasonic transducer 230 which is connected to driver circuit 228. Ultrasonic transducer 230 produces an ultrasonic signal which is detected at the control base by ultrasonic detectors 254 and 256. As indicated above, operating voltage is supplied to the detectors and circuits described above by battery 222. A power switch 232 is activated when the operator grasps mouse 220 in his hand. Power switch 232 may be spring actuated biased in the off position to preserve battery life such that power is not applied to the circuits when the mouse is not in use.

Figure 6:
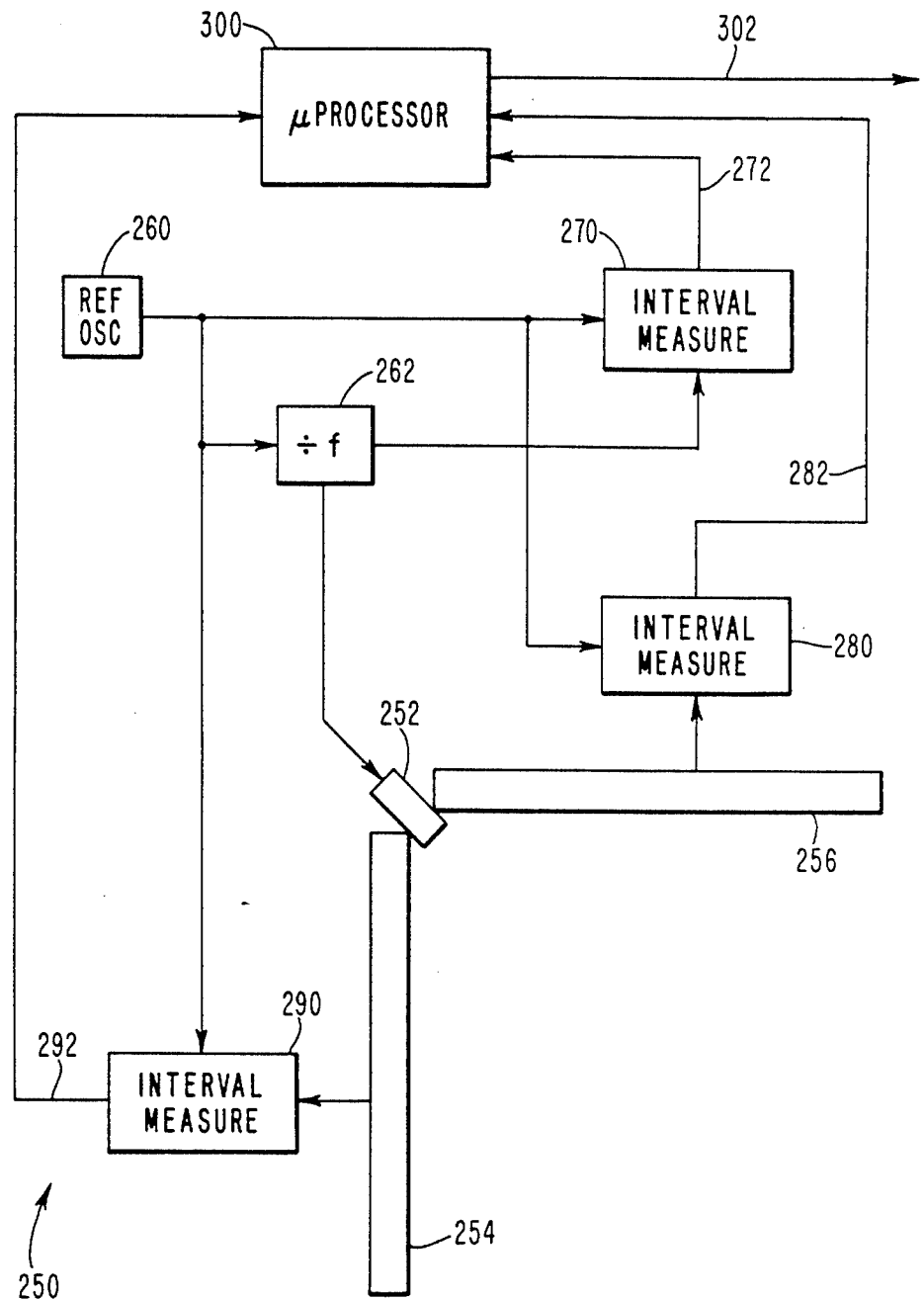
FIG. 6 is a block diagram of a base station of a cursor control system according to the present invention.

Referring now to FIG. 6, the circuit of a control base according to the present invention will be described. As indicated above, control base 250 includes an infrared emitter 252 which transmits infrared energy modulated by an ultrasonic signal nominally in the range of approximately 40 kilohertz. A reference oscillator 260 generates a reference clock signal at a high repetition rate such as 20 megahertz before providing time reference signals to interval measurement circuits 270, 280 and 290 respectively. Reference oscillator 260 also provides an input to frequency divider 262 which divides a reference frequency to a signal in the ultrasonic range such as approximately 40 kilohertz for modulating the infrared emissions of infrared emitter 252. This provides a reference frequency signal which can then be compared against ultrasonic signals detected by ultrasonic detectors 254 and 256 respectively which received the ultrasonic emissions from a wireless cursor control mouse 220.

The output of ultrasonic detector 254 is connected to a second input of interval measurement circuit 290 which measures the frequency of the received ultrasonic signal in terms of a reference signal. The frequency output of interval measurement circuit 290 provides an input to microprocessor 300.

Similarly, interval measurement circuit 280 measures the signal received by ultrasonic detector 256 and produces a frequency output signal on line 282 as a second input into microprocessor 300. The third interval measurement circuit 270 measures the frequency of reference oscillator 260.

Microprocessor 300 contains a program stored in read only memory residing within microprocessor 300 which calculates cursor control signals for X and Y motion of a display cursor and transmits these cursor control signals to a display terminal such as display terminal 210 shown in FIG. 2 on lines 302.

The details of the calculation program stored in the microprocessor memory will not be set forth herein since the implementation of the program from the equations set out below under the operation of the invention would be well within the skill of the art.

Referring now to FIG. 8, an interval measurement circuit 270, 280, 290 according to the present invention and as shown in FIG. 6, will be further described.

Each of the interval measurement circuits 270, 280 and 290 are identical. The outputs from ultrasonic detectors 254 and 256 are each connected to an input of a positive edge detector 802 and at interval measurement circuit such as 280 or 290 respectively. The output of positive edge detector 802 is connected to a count input 804 of counter 806 which effectively counts the frequency of signal received by the ultrasonic detectors 254 and 256 when an active signal is present on an enable input 808. The enable input 808 is controlled by flip-flop 810 which has an input D always true, and a clock input triggered by microprocessor 300 at the beginning of a measurement interval which enables counter 806 and permits a count of the received ultrasonic frequency.

OR circuit 812 is active from the time the first positive edge is received from ultrasonic detectors 254 and 256 until a predetermined count is reached. Counter 816 is enabled to count the reference oscillator 260 during the period the OR circuit 812 is active, providing a measurement of the interval during which a predetermined number of positive ultrasonic transitions have been made in terms of the reference oscillator frequency.

The output 818 of counter 816 is connected to microprocessor 300 as one of inputs 272, 282 or 292 respectively. The count which appears on the inputs to microprocessor 300 represent the frequency of the modulation content transmitted by the infrared emitter 252 (see FIG. 6) and the frequency detected by ultrasonic detectors 254 and 256 respectively.

When counter 806 becomes full, a carry is generated on carry output 820 which clears counter 806, resets flip-flop 810 and sends an interrupt signal to microprocessor 300. Microprocessor 300 then reads and clears counter 816 so that another interval measurement may be made as the cursor position image device 220 is moved.

OPERATION

Figure 7:
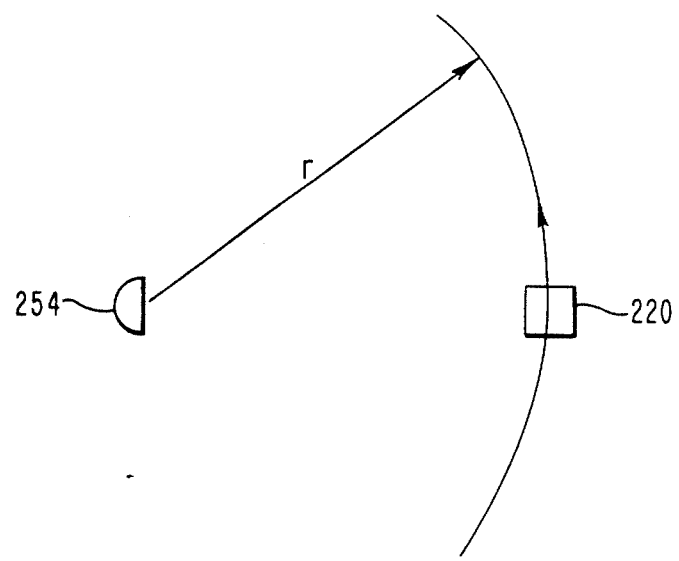
FIG. 7 is a schematic drawing of geometric relationship of a transmitter and detector to illustrate frequency change as a function of radial motion of the detector in accordance with the present invention.

The operation of the cursor control system according to the present invention will now be described with further reference to FIGS. 4, 7. The initial distances D1 and D2 of cursor control mouse from ultrasonic detectors 254 and 256 respectively in control base 250 are determined roughly by conventional means. For example, the time interval between an interruption in the infrared signal from infrared emitter 252 to an interruption in the ultrasonic signal received at ultrasonic transducers 254 and 256 can be measured by circuitry not shown. This measurement need only be approximate. Since the distance between the ultrasonic transducers C is known, the X and Y coordinates of the initial position of cursor control mouse 220 relative to the control base 250 can be determined from the following equations:

$$X = (C^2 + D_1^2 - D_2^2)/2C$$

$$Y = (D_1^2 - X^2)^{\frac{1}{2}}$$

Once the initial position of the cursor control mouse 220 has been calculated and the X and Y coordinates have been determined, the direction and velocity of relative motion of the cursor control mouse 220 can be determined as follows:

The sin of angle $\alpha$ is calculated as being equal to $Y/D_1$ and the sin of angle $\beta$ is calculated as being equal to $Y/D_2$, $$\sin \alpha = Y/D_1$$

$$\sin \beta = Y/D_2.$$

The magnitude and direction of motion vectors S and T are directly proportional to the Doppler effect change in frequency detected by ultrasonic detectors 254 and 256 respectively and computed in microprocessor 300.

As is well known, when an object emitting radiation approaches a detector, the apparent detected frequency is increased and when the object moves away from the detector the apparent detected frequency decreases. The following equations relate motion vectors S and T to change in frequency received by ultrasonic detectors 254 and 256 respectively:

$$S = k\Delta f_1$$

$$T = k\Delta f_2$$

where $\Delta f_1$ and $\Delta f_2$ are the changes in received frequencies by ultrasonic detectors 254 and 256 respectively. The components of motion along the X and Y axes $\Delta X$ and $\Delta Y$ may now be calculated as follows:

$$\text{cosine } \beta = \Delta X_1/T$$

$$\text{cosine } \alpha = \Delta X_2/S$$

where $$\Delta X = \Delta X_1 - \Delta X_2 = T \text{ cosine } \beta - S \text{ cosine } \alpha$$

and $$\sin \beta = \Delta Y_1/T$$

$$\sin \alpha = \Delta Y_2/S$$

and $$\Delta Y = \Delta Y_1 + \Delta Y_2 = T \sin \beta + S \sin \alpha.$$

Thus, once $\Delta f1$ and $\Delta f2$ respectively have been determined from interval timers 270, 280 and 290, motion vectors S and T can be calculated and since angles $\alpha$ and $\beta$ are known from the initial position determination, $\Delta X$ and $\Delta Y$ can be directly calculated to determine the change in position of cursor control mouse 220 relative to control base 250.

The above described cursor control system has the advantage over the prior art of complete freedom from constraint as to motion of the cursor control device and lack of necessity of any special surface on which the cursor control device must be operated. There are no wheels as in the prior art cursor control mouse device, nor need the device be operated on a textured surface. In fact, the cursor control device according to the present invention may be moved through space by the operator and still function effectively to position a cursor in a display system.

Thus, while the invention has been described with reference to preferred embodiments thereof, it will be understood by those skilled in the art that various changes in form and details may be made without departing from the scope of the invention.

What we claim as new and desire to secure by Letters Patent is:

1. Apparatus for controlling the motion of a cursor on a screen comprising:
   a wireless cursor position control device with an infrared detector for detecting a first signal transmittal from a control base and an ultrasonic emitter for transmitting a second signal generated in response to said detected first signal,
   a control base with one or more infrared emitters for transmitting signals to said first detector in said cursor position control device and a plurality of ultrasonic detectors for receiving signals from said ultrasonic emitters in said cursor position control device, and
   means to calculate the relative motion of a cursor from said directions and velocity of said cursor position control device.

2. Apparatus according to claim 1, wherein said wireless cursor position control device further comprises:
   means for driving said ultrasonic emitter with a signal detected from said infrared detector.

3. Apparatus according to claim 1, wherein said wireless cursor position control device further comprises:
   power supply means, independent from mains, from supplying operating voltage and current to said ultrasonic emitters and said infrared detector and said driving means.

4. Apparatus according to claim 1, wherein said control base means for detecting direction and velocity further comprises: one or more means for detecting change in a first characteristic of signals received from said device indicative of direction and velocity of motion of said device.

5. Apparatus according to claim 4, wherein said control base means for detecting direction and velocity further comprises:
   reference signal generation means for generating reference signals to compare with signals from said device.

6. Apparatus according to claim 4, wherein said control base means for detecting direction and velocity further comprises:
   frequency shift detection means for detecting change in frequency of said signals received from said device indicative of direction and velocity of motion of said device.

7. Apparatus according to claim 4, wherein said control base means for detecting direction and velocity further comprises:
   processing means for generating motion control signals in response to changes in said first characteristic of said signals from said device.

8. A method for generating signals for motion control comprising the steps of:
   determining X and Y coordinates of an initial position of an cursor position control device relative to first and second detector mounted in a base;
   transmitting a first signal from a transmitter in said base to a receiver in said device;
   detecting said first signal in said device;
   transmitting from said device a second signal generated from said detected first signal;
   receiving said second signal at said first and second detectors in said base;
   determining first and second difference signals from comparison of said first signal with outputs of said first and second detectors;
   calculating cursor motion signals from said difference signals to move an cursor in correspondence with the direction and velocity of motion of said device.

* * * * *